United States Patent [19]
McGuirk, Jr.

[11] 3,937,976
[45] Feb. 10, 1976

[54] DISGUISED COIL FOR SECURITY SYSTEM FOR AUTOMOTIVE VEHICLES AND THE LIKE

[75] Inventor: Francis A. McGuirk, Jr., Chatham, N.J.

[73] Assignee: Wagner Electric Corporation, Parsippany, N.J.

[22] Filed: Sept. 20, 1974

[21] Appl. No.: 508,292

[52] U.S. Cl................. 307/10 AT; 174/52 PE
[51] Int. Cl.² ........................................... H02G 3/00
[58] Field of Search.................... 307/10 R, 10 AT; 174/52 PE; 340/149 A, 274 C; 317/101 D, 146, 101 CC; 336/DIG. 2; 200/293, 294, 296

[56] References Cited
UNITED STATES PATENTS

| | | |
|---|---|---|
| 3,035,239 | 5/1962 | Ringland ...................... 174/52 E X |
| 3,063,134 | 11/1962 | McGraw ......................... 174/52 PE |
| 3,504,132 | 5/1970 | Wallace .......................... 174/52 PE |
| 3,836,825 | 9/1974 | Hall et al. .................. 174/DIG. 5 X |

*Primary Examiner*—Robert K. Schaefer
*Assistant Examiner*—M. Ginsburg
*Attorney, Agent, or Firm*—Eyre, Mann & Lucas

[57] ABSTRACT

A coil is encapsulated in a symbol formed of cast epoxy for display on the exterior of an automobile. The coil is connected to and forms part of a security system which is actuated by the inductive coupling of a keying circuit to the encapsulated coil. Two threaded metal rods are partially embedded in the epoxy symbol to enable mounting on the exterior of an automobile.

5 Claims, 3 Drawing Figures

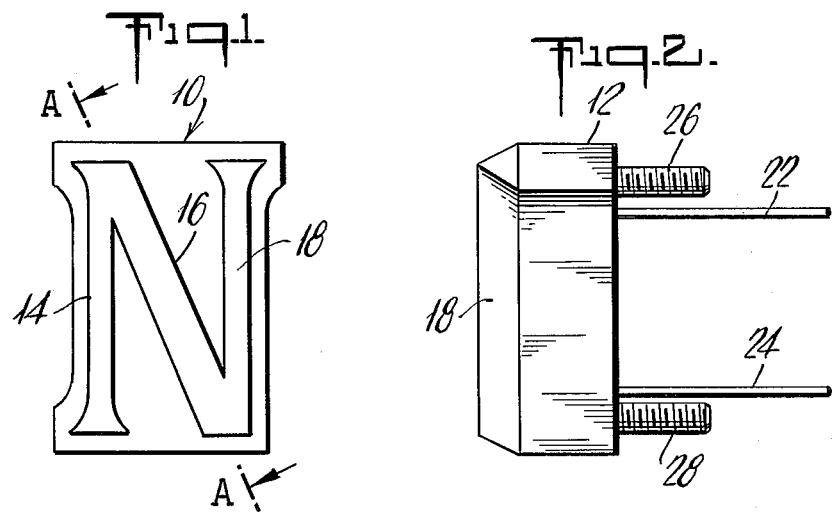
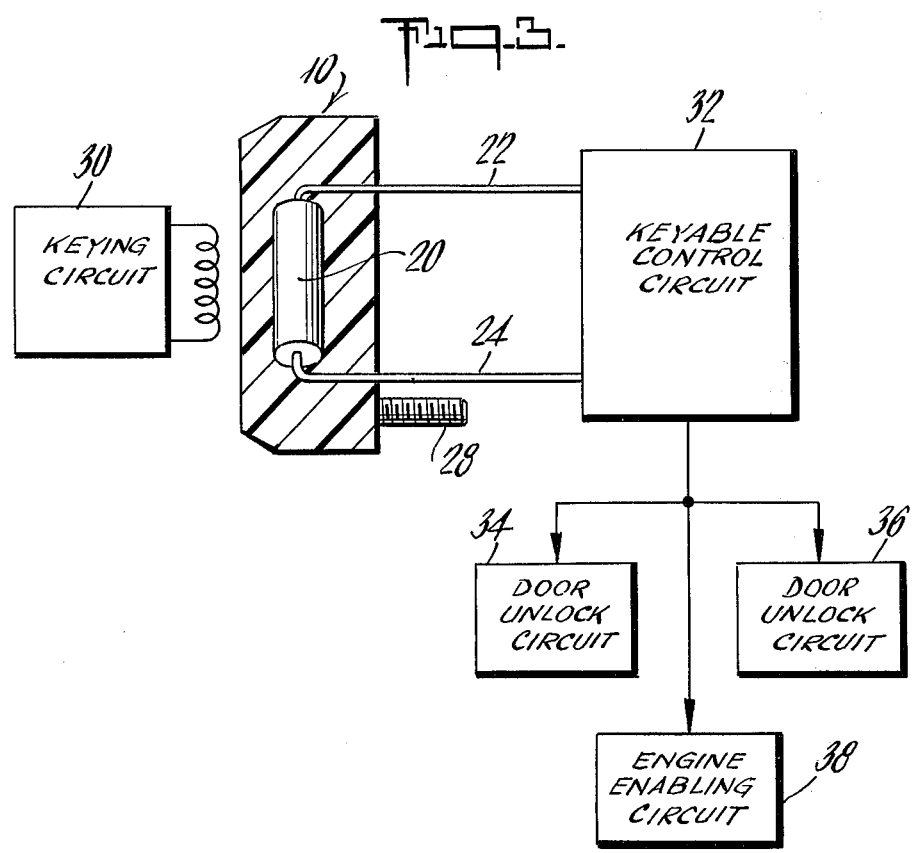

3,937,976

DISGUISED COIL FOR SECURITY SYSTEM FOR AUTOMOTIVE VEHICLES AND THE LIKE

CROSS-REFERENCES TO RELATED APPLICATIONS

The present invention may be advantageously employed with any one of a number of security systems for automotive vehicles and the like, such as the systems disclosed and claimed in U.S. Pat. No. 3,801,798 issued on Apr. 2, 1974 upon application Ser. No. 361,249 entitled POWER TRANSFER CIRCUIT FOR MOMENTARILY ENERGIZING KEYABLE CONTROL CIRCUITS filed on May 17, 1973 in the name of Carl E. Atkins; U.S. Pat. No. 3,824,403 issued on July 16, 1974 upon application Ser. No. 289,283 entitled POWER CONTROL CIRCUIT FOR AUTOMOTIVE VEHICLES AND THE LIKE filed on Sept. 15, 1972 in the name of Francis A. McGuirk; U.S. Pat. No. 3,723,967 issued on Mar. 27, 1973 upon application Ser. No. 127,463 entitled INDUCTION-KEYED DOOR-LOCK AND POWER CONTROL CIRCUIT FOR AUTOMOTIVE VEHICLES AND THE LIKE filed on Mar. 24, 1971 in the names of Carl E. Atkins and Paul A. Carlson; copending application Ser. No. 323,827 entitled DOOR LOCK, POWER AND ALARM CONTROL CIRCUIT FOR AUTOMOTIVE VEHICLES AND THE LIKE filed on Jan. 15, 1973 in the name of Francis A. McGuirk, now U.S. Pat. No. 3,866,168 issued on Feb. 11, 1975; copending application Ser. No. 345,281 entitled INDUCTION-KEYED AUTOMATIC IGNITION CONTROL SECURITY SYSTEM filed on Mar. 27, 1973 in the name of Paul A. Carlson, now abandoned; copending application Ser. No. 301,438 entitled INDUCTION-KEYED CONTROL CIRCUIT WITH KEYING NETWORK HAVING VARIABLE RESONANT FREQUENCY filed on Oct. 27, 1972 in the name of Carl E. Atkins, now U.S. Pat. No. 3,842,324 issued on Oct. 15, 1974; and copending application Ser. No. 418,683 entitled DUAL-MODE SECURITY CIRCUIT FOR AUTOMOTIVE VEHICLES AND THE LIKE filed on Nov. 23, 1973 in the name of Paul A. Carlson, now U.S. Pat. No. 3,852,614 issued on Dec. 3, 1974. The disclosures of each of the aforementioned patents and applications are incorporated herein by reference.

BACKGROUND OF THE INVENTION

In retrofitting security systems of the type disclosed and claimed in the cross-referenced applications, the initial approach was to cut a slot in an existing symbol, such as a letter or number forming part of the trademark or model mark on the vehicle, and to glue a sensing coil in the slot. Although this retrofitting technique produced an operative system, it was not completely satisfactory for the reasons that the placement of the sensing coil in the symbol, which was formed of metal, degraded the merit factor or Q of the coil and also made it difficult to re-mount the symbol on the exterior of the automobile. In addition, there was little control over the positions from which the coil leads extended from the modified symbol with the coil inserted therein. The present invention involves the recognition of the aforementioned problems and disadvantages, and provides a solution therefor.

SUMMARY OF THE INVENTION

The present invention is embodied in the combination of a coil encapsulated in a symbol formed of cast epoxy resin. Means such as threaded rods extend rearwardly from the epoxy symbol to enable mounting of the symbol on the exterior of an automobile. Preferably, the symbol is formed by a raised surface or surfaces extending from a base of contrasting color, and the coil extends at least partially into an extended portion forming a raised surface to enable closer inductive coupling with the associated keying circuit.

BRIEF DESCRIPTION OF THE DRAWING

The present invention will be better understood when the written description thereof is read in the light of the accompanying drawing, of which:

FIG. 2 is a plan view of a cast epoxy symbol in the form of a letter of the alphabet;

FIG. 2 is a side view of the cast epoxy symbol shown in FIG. 1 showing the threaded mounting rods and the coil leads extending from the rear surface; and FIG. 3 is a sectional view taken along line A—A in FIG. 1, showing the coil aligned with the diagonal part of the symbol and also showing the relationship of the coil to the other components of a security system.

DETAILED DESCRIPTION OF THE PREFERRED EMBODIMENT

Referring to the drawing, the symbol formed by casting epoxy resin in a suitable mold is shown for exemplary purposes as being the letter N of the English alphabet. The casting 10 forming this symbol comprises a base portion 12 and extended portions forming raised surfaces 14, 16 and 18 which form the letter N. The color or the epoxy resin casting may be any preselected color and the raised surfaces 14, 16 and 18 may be painted with any one of a number of contrasting colors. A coil 20 is encapsulated by the epoxy resin symbol as a result of being placed in the mold either prior to the introduction of the resin, or after the introduction of the resin but before it has been hardened. The leads 22, 24 from coil 20 extend out of the casting 10 at predetermined locations, e.g., from the rear surface of the casting 10 as shown in FIGS. 2 and 3. Similarly, the threaded rods 26 and 28 are partially embedded in the casting 10 and also extend from the rear surface to enable mounting of the casting 10 on a panel or surface on the exterior of an automobile, for example. These threaded rods 26 and 28 are shown as being disposed vertically, i.e., one directly over the other, although other arrangements may be employed.

In the sectional view of casting 10 shown in FIG. 3, the coil 20 is shown as extending into and being aligned with the raised portion 16 shown in FIG. 1. In this position, closer inductive coupling of the coil 20 with the cooperative coil which forms part of keying circuit 30 is made possible. When the keying circuit 30 is brought into a spatial relationship with coil 20 so that sufficient inductive coupling is effected, keyable control circuit 32 will produce an output signal which actuates the door unlock circuits 34 and 36 and causes the engine enabling circuit 38 to enable engine start-up for a predetermined period of time.

By the present invention, applicant has secured all of the advantages of encapsulation of an electronic component, and at the same time has provided an effective disguise for the sensing element of the keyable control circuit. Since even a sophisticated thief would not be able to discern which of the various symbols (indicia, letters, numbers or designs) affixed to the exterior of an automobile contains the sensing element (coil 20), he will therefore be unable to even attempt unauthorized entry to the vehicle by a keying circuit which he may have constructed himself, or may have stolen from the vehicle owner. Consequently, the efficacy of the security system in the automobile is enhanced by the present invention.

The advantages of the present invention, as well as certain changes and modifications of the disclosed embodiment thereof, will be readily apparent to those skilled in the art. It is the applicant's intention to cover all those changes and modifications which could be made to the embodiment of the invention herein chosen for the purposes of the disclosure without departing from the spirit and scope of the invention.

What is claimed is:

1. A security system comprising:
A keyable control circuit operative to generate a signal to actuate at least a door unlock circuit; a sensing element connected to said keyable control circuit for coupling a key circuit to said keyable control circuit; a molded epoxy resin casting having a plurality of surfaces encapsulating said sensing element; at least one predetermined symbol molded into a first surface to disguise said sensing element; mounting means molded into and extending from a second surface of said epoxy resin casting; and electrical connections from said sensing element molded into and extending from the same second surface of said epoxy resin casting.

2. A security system as recited in claim 1 wherein said sensing element is positioned close to a predetermined surface of said epoxy resin casting to facilitate coupling of the keying circuit thereto.

3. A security system as recited in claim 1 wherein said epoxy resin casting comprises a base portion and at least one extended portion forming a raised surface, said sensing element being at least partially positioned within said extended portion in proximity with said raised surface.

4. A security system as recited in claim 1 wherein the sensing element comprises a sensing coil disposed in some known angular relationship with respect to some feature of said molded letter or numeral in the said epoxy resin casting.

5. A security system for motor vehicles comprising:
a. a keyable control circuit, said keyable control circuit being operative to generate a signal to actuate at least a door unlock circuit;
b. a sensing element connected to said keyable control circuit, said sensing element being operative to couple said keyable control circuit to a keying circuit;
c. a plurality of epoxy resin castings mounted on the exterior of the motor vehicle at least some of which are provided with an integrally molded identifying symbol, each said epoxy resin casting having a plurality of surfaces and said identifying symbol being on one said surface;
d. said sensing element being encapsulated in one said epoxy resin casting provided with said integrally molded identifying symbol and being aligned essentially parallel to the surface having the identifying symbol;
e. leads extending from a second said surface of the epoxy resin casting having the encapsulated sensing element; and
f. mounting means spaced from the leads extending from the same second said surface as that from which the leads extend.

* * * * *

UNITED STATES PATENT OFFICE
CERTIFICATE OF CORRECTION

PATENT NO. : 3,937,976
DATED : February 10, 1976
INVENTOR(S) : Francis A. McGuirk It is certified that error appears in the above-identified patent and that said Letters Patent are hereby corrected as shown below:

Col. 2, Line 18: "Fig.2 is a plan view" should read

--Fig. 1 is a plan view--

Col. 3, Line 24 - Claim 1: "key" should read --keying--

Col. 3, Line 33 - Claim 1: "said' omitted before "second"

Signed and Sealed this eighteenth Day of May 1976

[SEAL]

Attest:

RUTH C. MASON
Attesting Officer

C. MARSHALL DANN
Commissioner of Patents and Trademarks